United States Patent Office 2,972,474
Patented Feb. 21, 1961

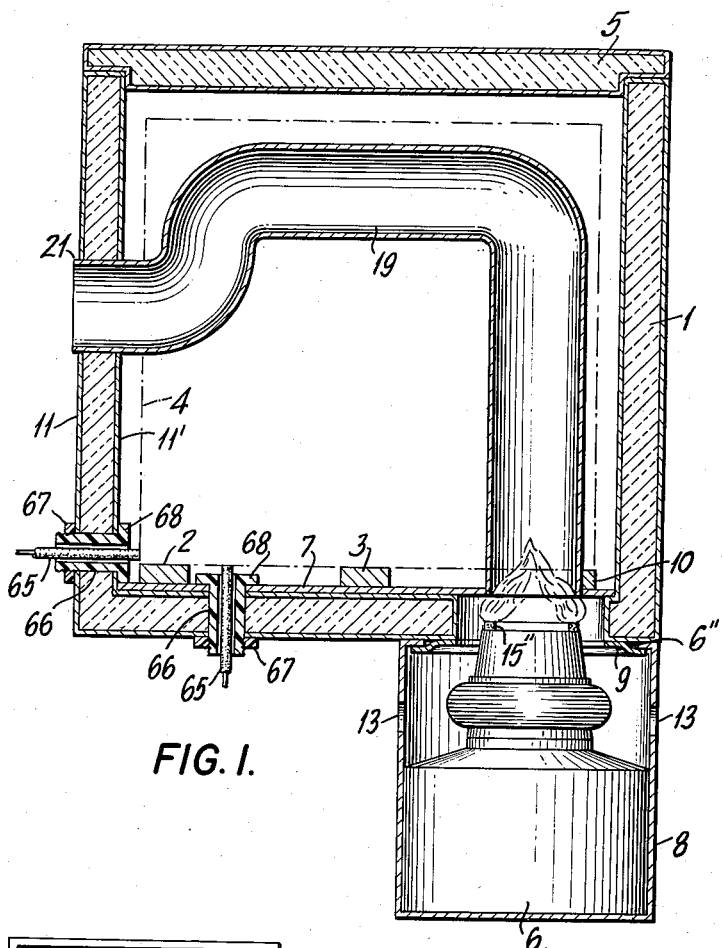
FIG. I.
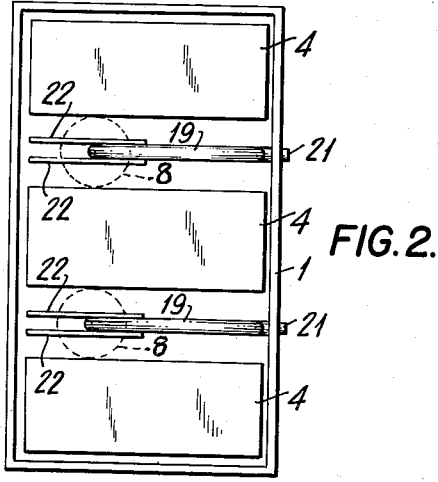
FIG. 2.
INVENTORS.
ROBERT VON LINDE &
BY WALTER BAIER
ATTORNEY.

2,972,474
ACCUMULATOR HEATING DEVICE

Robert von Linde, Planegg, near Munich, and Walter Baier, Stockdorf, near Munich, Germany, assignors to Wilhelm Baier K.G., Stockdorf, near Munich, Germany Filed Aug. 3, 1954, Ser. No. 447,511

Claims priority, application Germany Aug. 6, 1953

1 Claim. (Cl. 263—2)

This invention relates to certain improvements in or relating to devices for heating accumulators, more particularly in motor vehicles, in order to increase their efficiency and to facilitate the starting of the engine at low temperature.

It is an object of the present invention to provide a heating device of the kind referred to which is simple, reliable, efficient, small, cheap in construction and operation, and free from deleterious auxiliary effects.

With these and further objects in view, according to the present invention, the heating device comprises a casing or chamber for accommodation of the accumulator, said chamber being closed at least at the top and lateral sides, a burner, and an exhaust gas duct extending through said casing or chamber and being adapted to heat the air surrounding the accumulator and to remove the exhaust gases of the burner in such a way that they are prevented from causing local overheating of the accumulator or impairing it by deposition of moisture or other constituents of the exhaust gases on the accumulator.

Preferably, moreover, a heat conductor having a large surface and more particularly a large horizontal extension, is provided in the chamber, especially below the accumulator, said heat conductor being adapted to be heated by the burner and having an opening to which the inlet end of the exhaust gas duct is connected. The battery may be supported on the heat conductor, which in this case takes the form of a plate, through insulating spacer strips preventing undue local heating of the battery.

The burner is constructed in such a way that the heat produced by the burner and transmitted to the accumulator through the exhaust gas duct and through the horizontal heat conductor is at least sufficient to compensate the loss of heat dissipated from the accumulator per unit of time.

Preferably, the outer casing surrounding the accumulator and forming said chamber should have walls of a high heat insulating effect i.e. of a magnitude of heat conduction not exceeding 4 to 5 kcal./m.² h. ° C. More particularly, the magnitude of heat conduction of the walls should not exceed the figure 4–5 kcal./m.² h. ° C.; it has been found that with a heat insulation of this magnitude the source of heat can be kept within reasonable limits as to its size and fuel consumption, even at $-15°$ C. or less.

Other and further objects, features and advantages of the invention will be pointed out hereinafter and appear in the appended claim forming part of the application.

In the accompanying drawing a preferred embodiment of the invention is shown by way of illustration and not by way of limitation.

Fig. 1 is a sectional view of a preferred form of the device according to the invention, and Fig. 2 is a plan view of the device of Fig. 1 with several burners.

Referring now to the drawings in greater detail, and first to Fig. 1, it will be seen that the accumulator or battery, indicated by the dot and dash lines at 4, is accommodated in an insulating casing 1 having a cover 5, an outer wall 11 of sheet iron of 1.5 millimeter thickness and an inner wall 11' of a thickness of 2 millimeters, consisting of a synthetic material produced on the basis of polyvinyl chloride or any other synthetic plastic having favorable heat insulating properties and being resistant against the electrolyte contained in the battery. The space between these outer and inner wall plates is filled up with expanded cork meal of 30 millimeter thickness having a coefficient of thermal conduction of 0.03 kcal./m. h. ° C. The bottom plate of this casing is formed with a bore forming a casing for a burner 6 including a container 15 for fuel oil which is fed to the top end of a wick 15'' and burnt. The bore communicates with a tube 19 in the form of an inverted U terminating in an outlet 21 fitted in an opening in one of the side walls of the casing 1. The tube 19 preferably consists of iron. The tube 19 may be provided with four ribs 22, as best seen in Fig. 2, for better heat transmission.

It will thus be seen that the exhaust gases of the burner do not come into touch with the space within the casing 1, 5, in which the accumulator 4 is accommodated. Therefore, the water vapors necessarily contained in the exhaust gases are prevented from depositing on the cold accumulator where they would impair the electric insulation or cause decay of the electric insulating material.

By way of alternative, a pair of accumulators 4 may be arranged in casing 1 on both sides of the U-shaped exhaust tube 19. The battery or batteries are supported on a metal plate 7, by means of spacing strips 2, 3 and 10. The burner 6 is secured to the bottom of the casing 1, by means of a burner casing 8 whose inwardly bent edge portions 6'' are slidably engaged in the recess between the bottom wall of the insulating casing 1 and a pair of cranked strips 9. By way of alternative, bayonet fixings, hooks or the like may be provided. The combustion air is sucked in through holes 13 provided in the bottom and/or side walls of the burner casing 8. It will thus be seen that the burner 6 heats the exhaust tube 19 and the plate 7 which has a high heat conductivity. The battery or batteries 4 are thus heated through the tube 19 and through the plate 7, by heat radiation and conduction through the air. The additional heating from the bottom is particularly favorable since it counteracts the tendency of the electrolyte to freeze and congeal at the bottom of the cell.

By way of alternative, the strips 2, 3 and 10 may be replaced by a plate (not shown) having a moderate heat insulating effect, so as to prevent the battery from undue local heating.

The cable inlets and outlets are arranged in the bottom wall of the casing 1 of the accumulator or in the immediate vicinity thereof as shown in Fig. 1. The connecting cables 65 of the battery 4 are passed through bores in the bottom wall and/or in the side wall of the casing, near the bottom thereof. Insulating sleeves 66 of porcelain or the like are inserted in the bores and fixed therein by means of nut members 67 threadedly engaged with a male thread on the outer end of the sleeves whose inner ends are formed with an end flange 68 as shown. Outlets for overflowing electrolyte may also be provided in said bottom wall. In this manner the heated air is prevented from flowing out of the insulating casing through top side passages for the cables and the heating is made more effective.

Fig. 2 illustrates an arrangement in which two burner devices of the type shown in Fig. 1 are arranged in a common casing 1 with three accumulator units 4.

While the invention has been described in detail with respect to certain now preferred examples and embodiments of the invention it will be understood by those skilled in the art after understanding the invention that various changes and modifications may be made without departing from the spirit and scope of the invention and it is intended therefore, to cover all such changes and modifications in the appended claim.

We claim:

A device for heating accumulators, comprising, in combination, a heat-insulating casing dimensioned to surround and wholly enclose the accumulator and having a bottom and being closed at least at its top and sides, said accumulator being adapted to be supported at a predetermined level in said casing, a burner, and an exhaust gas duct communicating directly with said burner and extending continuously through said casing and having an outlet communicating with the exterior of said casing, substantially all of said exhaust gas duct extending above said level whereby it will extend along the sides of the accumulator, and said duct being adapted to heat the air surrounding the accumulator in said casing and to remove the exhaust gases from the burner to transfer the heat contained in said gases to the accumulator by convection and radiation but preventing said exhaust gases from coming in contact with the accumulator, a heat conductor having a large horizontal extension disposed adjacent said bottom and positioned to be heated by the burner flame, said heat conductor being in the form of a plate and having an opening which is gastightly connected with the exhaust gas duct and through which said duct extends, and heat insulating space means supporting the accumulator upon said plate.

References Cited in the file of this patent

UNITED STATES PATENTS

| | | |
|---|---|---|
| 734,346 | Mink | July 21, 1903 |
| 763,717 | Buckley | June 28, 1904 |
| 1,371,773 | Cannon | Mar. 15, 1921 |
| 1,424,394 | Doolittle | Aug. 1, 1922 |
| 1,556,662 | Woolson | Oct. 13, 1925 |
| 1,558,848 | Doble | Oct. 27, 1925 |
| 1,613,347 | Ermatinger | Jan. 4, 1927 |
| 1,666,367 | Clausing | Apr. 17, 1928 |
| 2,104,768 | Saunders | Jan. 11, 1938 |
| 2,104,769 | Saunders | Jan. 11, 1938 |
| 2,133,577 | Saunders | Oct. 18, 1938 |
| 2,286,854 | Holthouse | June 16, 1942 |
| 2,440,369 | Furman | Apr. 27, 1948 |
| 2,531,139 | Lilly et al. | Nov. 21, 1950 |
| 2,666,091 | Martin et al. | Jan. 12, 1954 |
| 2,690,168 | Nallinger | Sept. 28, 1954 |
| 2,717,045 | Nallinger | Sept. 6, 1955 |